Patented June 14, 1938

2,120,549

UNITED STATES PATENT OFFICE 2,120,549

DRY POWDERED PHENOL RESIN

Theodore Williams Dike, Seattle, Wash., assignor to I. F. Laucks, Inc., Seattle, Wash., a corporation of Washington No Drawing. Application July 5, 1935, Serial No. 29,915

7 Claims. (Cl. 260—4)

The present invention relates to a new method of producing thermo-plastic substances and particularly alkali soluble, potentially reactive phenolic resins in dry powder form.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Certain types of phenol-formaldehyde resins are condensed in an aqueous medium in the presence of strongly alkaline condensation agents and may be brought to the desired stage of reaction without any separation into two layers, so that the liquid is a homogeneous alkaline solution of the resin in water. Such resins are potentially excellent adhesives. For example, the liquid may be applied to tissue paper and dried thereon, the product being a film glue. The liquid may also be applied to wood veneer corestock and after drying the cores may be assembled with face stock and the assembly hot pressed, whereupon the resin film on the cores functions as an adhesive in a similar manner to the tissue paper film glue.

With this type of resin adhesive a stable dry powder form capable of mixing with water with or without further addition of alkali or other reagent is desirable but hitherto has not been available.

The most direct manner of producing such a powder would be to spray dry the aqueous solution of the resin, but this has hitherto proved impossible because when the dry particles drop to the floor of the spray chamber, they are still hot and since they are thermo-plastic they at once coalesce into a mass.

It has now been found that this difficulty can be solved by cooling the dried particles before permitting them to have mutual contact. This may be done by any suitable arrangement. For instance the floor of the spray chamber may be cooled and provided with a textile, sheet metal, or woven metal belt surface, this being also kept cool and continuously moved out of the spray chamber to an outer cool chamber where the particles of resin are continuously swept off the belt and recovered.

A preferred arrangement is to provide another large cool chamber adjacent to the spray drying chamber, exhaust the hot resin-dust-laden air from the spray chamber after the resin is dry but before it has been able to settle out of the air, then in the cool chamber mix this air with a large amount of cool air and pass the mixture through a cool cyclone or dust collector where the cool dust-like resin is separated from the air and recovered.

Either of these arrangements or any other that sets up like conditions produces satisfactory results provided, of course, that the resin itself is a non-adherent solid at room temperature.

Some resins of this type, while they are solids at room temperature, possess properties of slow flow in the cold similar to asphalt so that they gradually coalesce on storage. This difficulty may be surmounted by mixing the resin powder with one to five per cent of light magnesium oxide, fine talc, or other coating substance which tends to prevent resin to resin contact between the particles of the powder. The mixing of the coating substance may be effected either by blowing it into the cooling chamber and mixing it with the resin particles when both are in suspension in the air, or by subsequent dry mixing after the resin powder has been cooled and recovered from the dust collector.

By the present method powders may be produced which can be stored indefinitely and are easily dispersed to a free-flowing, liquid glue by simple mixing with water with or without additional alkali or reagents. These powders may be used to make hot press glues, baking varnishes for the electrical industry and for all the purposes where an inexpensive, aqueous dispersion of potentially reactive phenol resins is desirable. Molding powders may be made by thoroughly incorporating the aqueous dispersion with suitable fillers and then drying and powdering the product.

The convenience of a cheaply produced stable powder of these characteristics that is capable of producing an aqueous dispersion is valuable in many commercial applications.

Another important advantage of this method as applied to phenolic resins and similar substances subject to polymerization or undesirable permanent change by the action of heat, is that the change from the fluid to the dry powder form is practically instantaneous and consequently produces scarcely any chemical change whatever. Other methods of drying do not provide this advantage. As it is usually easy to accurately predetermine the end point of the preliminary reactions required to make the resin solution, the present method makes it easy to produce a dry powdered product of definite properties. Also after the resin solution has been made, agents for the purpose of modifying the rate of final conversion to the insoluble, infusible form may be readily mixed with the fluid and the practically instantaneous method of drying permits their presence in the powdered product without their having been able to react upon the resin to any objectionable extent during the drying. This is an advantage over the method of incorporating such agents by working them into a plastic mass of the resin on hot rolls which permits objectionable reaction to take place during the considerable period during which the resin must remain hot in the presence of the accelerators. Consequently, it is possible to make powdered resins by this method which have new and unusual properties not obtainable by prior methods. Resins with exceptional speed of conversion for instance, are readily made by this method of spray drying, as amounts of accelerators can be incorporated which would be impossible to use if they had to be worked into the resin on hot rolls.

The form of the spray dried resin particles is interesting and characteristic. Under a microscope it will be noted that they are hollow spheres with a deep indentation on one face with a small hole in the middle of the indentation. This form is characteristic of spray dried colloidal solutions and is advantageous for rapid solution because of the large surface presented to the solvent.

Aqueous solutions or even suspensions of other thermoplastic substances may also be dried by this method provided the substances are non-adhering solids at room temperature.

Other modes of applying the principle of my invention may be employed, change being made as regards the details described, provided the features stated in the following claims or the equivalent of such be employed.

I therefore particularly point out and distinctly claim as my invention:—

1. The method of changing aqueous solutions and suspensions of thermo-plastic substances into particle form, comprising the steps of incorporating an accelerator in an aqueous solution of a thermo-plastic water-soluble synthetic resin, forming the solution into small particles, drying the particles in suspension in air and without mutual contact, and coating the particles with a coating powder, whereby non-agglomerated dry powder is produced.

2. The method of drying aqueous solutions and suspensions of thermo-plastic phenolic resinous substances, comprising the steps of providing an aqueous alkali hydroxide solution of a water-soluble phenol-formaldehyde resin, atomizing such solution to form particles, drying the particles in suspension in air and without mutual contact, and coating the particles with a coating powder, whereby non-agglomerated dry powder is produced.

3. The method of incorporating a fine powder divided coating substance in a finely divided thermo-plastic resin, comprising the steps of suspending both the resin and the coating substance in air and recovering the mixture by separating the mixed dust from the air.

4. As a new article of manufacture a spray dried thermo-setting resin carrying a superficial powder coating.

5. As a new article of manufacture a spray dried thermo-setting phenolic resin carrying a superficial powder coating.

6. As a new article of manufacture, a spray dried thermo-plastic powder of water-soluble non-agglomerated particles containing an accelerator, and carrying a superficial powder coating.

7. As a new article of manufacture, a spray dried thermo-plastic water-soluble phenol-formaldehyde resin in non-agglomerated particles having an alkali hydroxide content and carrying a superficial powder coating.

THEODORE WILLIAMS DIKE.